United States Patent [19]

Hunter

[11] Patent Number: 4,799,388

[45] Date of Patent: Jan. 24, 1989

[54] APPARATUS AND TECHNIQUE FOR METERING LIQUID FLOW

[76] Inventor: Robert M. Hunter, 320 S. Willson Ave., Bozeman, Mont. 59715

[21] Appl. No.: 51,325

[22] Filed: May 19, 1987

Related U.S. Application Data

[63] Continuation-in-part of Ser. No. 846,516, Mar. 31, 1986, abandoned.

[51] Int. Cl.⁴ .................................................. G01F 1/44
[52] U.S. Cl. ...................................... 73/861.63; 73/215
[58] Field of Search ...................... 73/215, 216, 861.63, 73/861.64

[56] References Cited

U.S. PATENT DOCUMENTS

| | | | |
|---|---|---|---|
| 2,283,906 | 5/1942 | Bennett | 73/215 |
| 3,427,878 | 2/1969 | Gerlitz, Jr. et al. | 73/215 |
| 3,719,081 | 3/1973 | Lynn et al. | 73 X/215 |
| 4,095,466 | 6/1978 | Schontzler et al. | 73/215 |

FOREIGN PATENT DOCUMENTS 1260808  2/1968  Fed. Rep. of Germany ........ 73/215

OTHER PUBLICATIONS

BIF Industries Technical Bulletin 110–P1, 8/58, p. 17.
Wenzel, "Meter for Sewer Measurements", in Journal of Hydraulic Div., 1/75, pp. 115–131.

Primary Examiner—Herbert Goldstein
Attorney, Agent, or Firm—Christopher Duffy

[57] ABSTRACT

The gravity flow of a liquid in an open pipe is metered during open channel flow, during surcharged flow, and during the transition between the two. A tubular venturi metering device is employed, and when during open channel flow, the liquid depth rises in the section of the pipe upstream from the device, the throat of the device fills with liquid substantially simultaneously with the upstream section of the pipe, so that during the transition, the device continues to provide a flow determination.

23 Claims, 2 Drawing Sheets

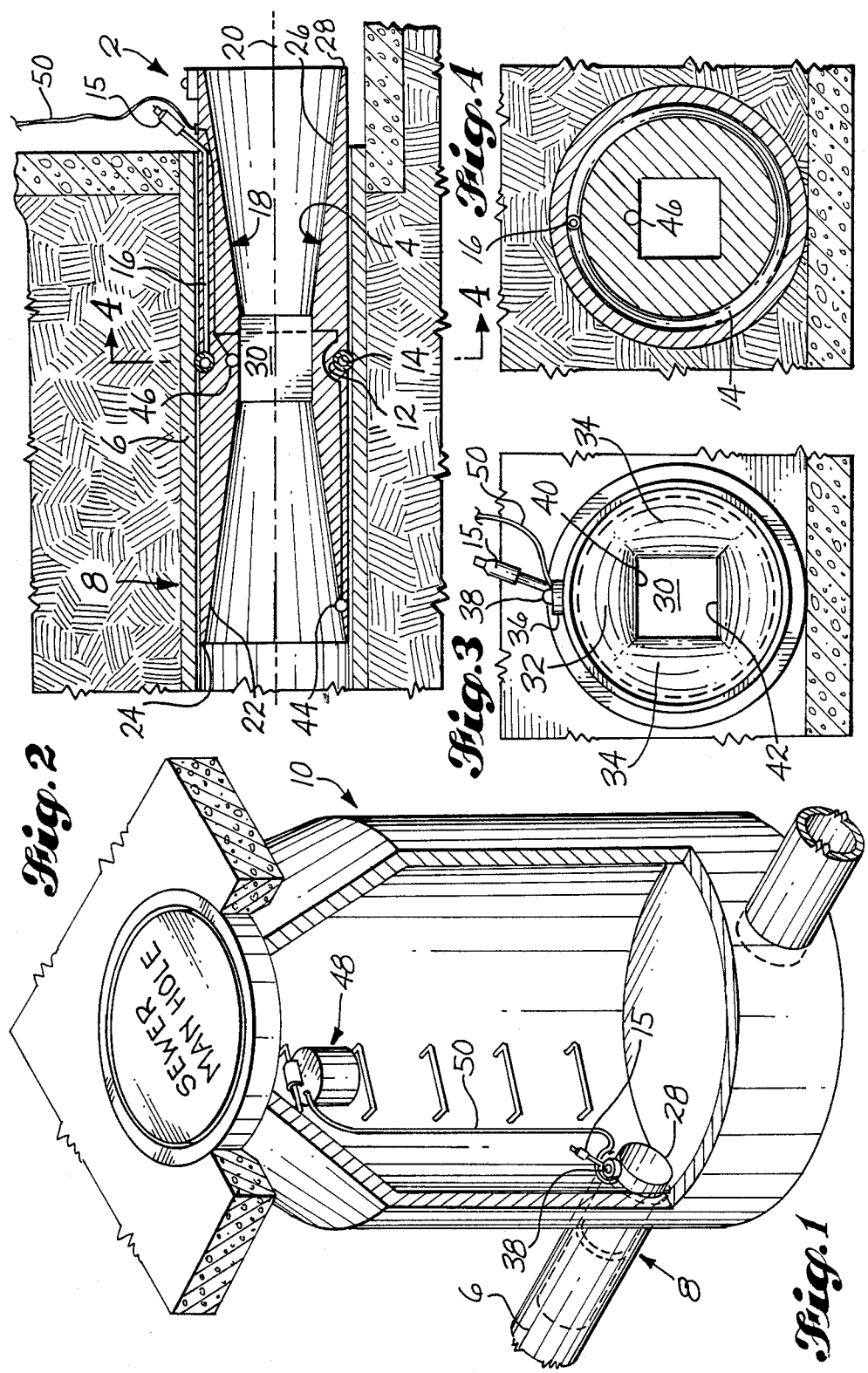

APPARATUS AND TECHNIQUE FOR METERING LIQUID FLOW

The present application is a continuation in part of copending application Ser. No. 846,516 filed Mar. 31, 1986, and entitled *Portable Wastewater Metering Device*. The previous application is now abandoned.

DESCRIPTION

1. Technical Field

This invention relates to an apparatus and technique for metering the flow of a liquid such as sewage, which is flowing by gravity in an elongated pipe that is open to atmosphere, both for the condition wherein the pipe is less than filled with the liquid, and the condition wherein the pipe is filled with the liquid. In particular, it relates to an apparatus and technique of this nature for metering the flow of storm drainage in a sewer pipe at a manhole therein.

2. Background Art

The rate of flow of sewage in a sewer pipe is commonly determined by determining the depth of flow in the same and then converting that into a flow rate. The depth of flow is often determined in turn by means of a weir or flume. Weirs and flumes do not provide a fully satisfactory means for measuring the rate of flow, however, when the sewer pipe is operating under surcharged conditions, that is, when the sewer pipe is filled to its top and perhaps flowing under a slight pressure condition. Under such conditions, a weir is difficult to calibrate and must be fabricated to suit the physical configuration of each sewer or manhole. It is also subject to upstream sedimentation and to being fouled by debris. Flumes, on the other hand, such as a Palmer Bowlus veturi flume, are inaccurate at upstream depths of flow that exceed 75% of the sewer diameter, and therefore, are useless under surcharged conditions. As an alternative, the head loss between two manholes may be measured (usually in fractions of an inch), and certain culvert formuli and the Manning formula may be used to estimate the flow rate. The estimate is in terms of a gross figure only, however, and of course, this method requires that the depth of flow be measured in two manholes, rather than one, thus doubling the cost of the operation.

DISCLOSURE OF THE INVENTION

The present invention provides an apparatus and technique for measuring the flow in a sewer pipe under both full and less-than-full conditions. According to the invention, a tubular venturi metering device is installed in the pipe so that the longitudinal axis of the open ended bore through the device is disposed substantially parallel to the longitudinal axis of the pipe. The bore has an axially inwardly tapered entrance section adjacent the upstream end thereof, which converges toward the axis of the bore in vertical planes paralleling the axis of the bore and in that axial direction of the bore relatively toward the downstream end of the bore, but terminates short of the axis of the bore so that a throat is formed in the bore which opens to the downstream end thereof. A liquid seal is formed between the device and the pipe at the outer periphery of the device so that the liquid in that section of the pipe upstream from the device is constrained to flow through the bore of the device, relatively toward the downstream end thereof. The static pressure of the liquid in the aforesaid upstream section of the pipe is determied when the liquid is flowing in the pipe at a depth less than that adapted to fill the upstream section of the pipe, to meter the flow in the pipe for the less-than-full condition thereof. Meanwhile, the cross-section of the throat is adapted, relative to that of the upstream section of the pipe, transverse the respective axes thereof, so that the throat fills with liquid substantially simultaneously with the upstream section of the pipe, when the liquid depth rises therein. Accordingly, when both the upstream section of the pipe and the throat are filled, the static pressure of the liquid in the throat of the device and the upstream section of the pipe can be determined, so that the difference between the latter two pressures can be determined in turn to meter the flow in the pipe for the full condition as well as the less-than-full condition of the same.

The bottom of the throat is commonly leveled before the repective determinations are made, and in the presently preferred embodiments of the invention, the throat has a polygonal cross-section, transverse the longitudinal axis of the bore.

The apparatus comprises a tubular venturi metering device which is installed in the pipe so that the longitudinal axis of the open ended bore through the device is disposed substantially parallel to the longitudinal axis of the pipe. The bore has an axially inwardly tapered entrance section adjacent the upstream end thereof, which converges toward the axis of the bore in vertical planes paralleling the axis of the bore and in that axial direction of the bore relatively toward the downstream end of the bore, but terminates short of the axis of the bore so that a throat is formed in the bore which opens to the downstream end thereof. In addition, there are means for forming a liquid seal between the device and the pipe at the outer periphery of the device so that the liquid in that section of the pipe upstream from the device is constrained to flow through the bore of the device, relatively toward the downstream end thereof. There are also first means for determining the static pressure of the liquid in the aforesaid upstream section of the pipe when the liquid is flowing in the pipe at a depth less than that adapted to fill the upstream section of the pipe, to meter the flow in the pipe for the less-than-full condition thereof. Meanwhile, the cross-section of the throat is adapted, relative to that of the upstream section of the pipe, transverse the respective axes thereof, so that the throat fills with liquid substantially simultaneously with the upstream section of the pipe, when the liquid depth rises therein. Second means are provided for determining the static pressure of the liquid in the throat and the upstream section of the pipe when both the upstream section of the pipe and the throat are filled, so that the difference between the latter two pressures can be determined to meter the flow in the pipe for the full condition as well as the less-than-full condition thereof.

In many of the presently preferred embodiments of the invention, the axially inwardly tapered entrance section of the bore of the device has a top, bottom and sides which taper axially inwardly of the axis of the bore in the aforesaid downstream axial direction thereof. Moreover, in certain embodiments, the wall of the axially inwardly tapered entrance section of the bore has a truncated conical cross-section in that vertical plane coinciding with the axis of the bore.

In some of the presently preferred embodiments of the invention, the bore also has an axially outwardly tapered exit section adjacent the downstream end thereof, which diverges from the axis of the bore in the aforesaid downstream axial direction thereof. Moreover, in certain of these embodiments, the wall of the axially outwardly tapered exit section of the bore has a truncated conical cross-section in that vertical plane coinciding with the axis of the bore.

In some of the presently preferred embodiments of the invention, the first pressure determination means includes a pressure sensor which is disposed on the device adjacent the upstream end of the bore. Preferably, the pressure sensor is disposed adjacent the bottom of the upstream end of the bore. In certain embodiments, moreover, the second pressure determination means includes a pressure sensor which is disposed on the device adjacent the throat of the bore therein, and preferably adjacent the top of the throat.

Preferably, the apparatus further comprises means for leveling one side of the device in the pipe, and preferably the bottom of the throat in the bore of the device. Also, the throat preferably has a polygonal cross-section, transverse the longitudinal axis of the bore.

Where the pipe and the device have cylindrical cross-sections transverse the respective longitudinal axes thereof, the seal forming means may include an inflatable tube which is circumposed about the device between it and the pipe. Preferably, the inflatable tube is seated in an annular groove formed about the outer periphery of the device.

The device may have a hollow or solid body construction between the outer periphery of the same and the bore therethrough.

In most of the presently preferred embodiments of the invention, there are also means for determining the flow in the pipe under the full and less-than-full conditions thereof, from the pressure of the liquid in the throat and the upstream section of the pipe.

Where there is a manhole to the sewer pipe, the metering device is often inserted in that portion of the pipe through which the flow enters the manhole.

In one group of presently preferred embodiments, the apparatus comprises, in combination, a cylindrical member having end portions disposed at substantially the same elevation and an inner surface forming a tubular venturi type device which in turn has an entrance section and a throat section. It also comprises means circumposed about the cylindrical member and operable to establish a fluid tight connection between the member and the internal wall of the pipe when the member is substantially coaxially inserted therein, whereby the liquid in that section of the pipe upstream from the member is constrained to flow through the entrance and throat sections of the venturi type device. In addition, there are means for sensing the pressure of the liquid at the crest of the throat section of the tubular venturi type device, and means for sensing the pressure of the liquid at the invert of the entrance section of the tubular venturi type device.

BRIEF DESCRIPTION OF THE DRAWINGS

These features will be better understood by reference to the accompanying drawings which illustrate a presently preferred embodiment of the invention that includes a portable tubular venturi metering device adapted to be installed in a cylindrical sewer pipe to meter the flow in the pipe at a manhole therein.

In the drawings:

FIG. 1 is a part cut-away, part perspective view of the manhole and the pipe when the device has been installed in the upstream or entrance section of the pipe;

FIG. 2 is a longitudinal cross-sectional view of the device along the longitudinal axis of the pipe;

FIG. 3 is an end view of the device from the manhole;

FIG. 4 is a cross-sectional view of the device along the line 4—4 of FIG. 2;

BEST MODE FOR CARRYING OUT THE INVENTION

Figure 8:
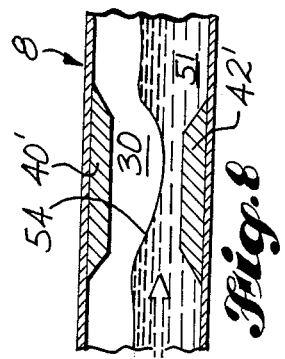
FIG. 8 is a schematic illustration of the operation of the inventive device in the open channel flow condition of FIG. 5.

Referring to the drawings, it will be seem that the portable device 2 has a cylindrical body 4 and is adapted diametrically to be slideably inserted into the entrance section 6 of a sewer pipe 8 from a manhole 10 therein. If necessary or desired, the body 4 of the device may be subdivided into two or more longitudinal sections (not shown) to facilitate its insertion in the pipe from the manhole; but in any event, the central portion of the device has an annular groove 12 about the circumference thereof, for receiving an inflatable collar 14 with which to fix and seal the device in the pipe. The collar 14 is mounted in the groove 12 prior to the insertion of the device in the pipe, and is equipped with an elongated valve stem 16, and a valve 15 thereon, through which gas can be charged into the collar 14 from the manhole 10, for purposes of inflating the collar.

As a tubular venturi metering device, the device 2 has an open-ended bore 18 through the same, and the longitudinal axis of the bore coincides with that of the device itself, so that when the device is installed in the pipe, the axis of the bore is substantially parallel to the axis 20 of the pipe. The bore 18 also has an axially inwardly tapered entrance section 22 adjacent the upstream end 25 thereof, which converges toward the axis of the bore in the downstream axial direction thereof. In addition, the bore 18 has an axially outwardly tapered exit section 26 adjacent the downstream end 28 thereof, which diverges from the axis of the bore in the aforesaid downstream axial direction thereof. The entrance and exit sections are interconnected at the axis of the bore by a polygonal throat 30. The cross-section of the throat 30 is adapted, relative to that of the pipe upstream from the device, transverse the respective axes thereof, so that the throat fills with liquid substantially simultaneously with the upstream section of the pipe, when the liquid depth rises therein, as shall be explained. However, for the present, suffice it to say that the throat 30 is orthogonal, and in fact, square in cross-section, whereas the entrance and exit sections 22 and 26 of the bore 18 are truncated cones 32 cut by vertical chords 34 at the sides thereof. See FIG. 3. The chords 34 are planar and terminate just short of the respective ends 24 and 28 of the device, so that in the end elevational view of FIG. 3, the cylindrical exit end 28 of the device is immediately apparent to the viewer, whereas the planar side walls 34 and the part conical top and bottom walls 34 of the exit section 26 lie therebehind.

As seen in FIGS. 1–3, moreover, the device 2 is equipped with a bench 36 on the top of the same, at the exit end 28 thereof, and a level indicator 38 is mounted on top of the bench. The level indicator 38 may be of the bubble-level type, with a crosshair for indicating the level condition. Both the bench 36 and the indicator 38 are on parallels to the top 40 and/or bottom 42 of the throat, so that the indicator 38 can be used to level the throat for the metering operation.

In addition, the device 2 has a pressure sensor 44 mounted beneath the entrance section 22 at the lower part conical wall or surface 32 thereof; and a second pressure sensor 46 is mounted at or near the top or crest 40 of the throat, at the surface thereof. The pressure sensors 44 and 46 may be either piezometers or piezoelectric pressure transducers.

The pressure sensor 44 is employed to determine the static pressure of the liquid in the upstream section of the pipe when the liquid is flowing in the pipe at a depth less than adapted to fill the upstream section of the pipe, so that the device can be used to meter the flow in the pipe for the less-than-full condition thereof. The pressure sensor 46 is employed to determine the static pressure of the liquid in the throat 30 of the device, so that the device can be employed to meter the flow in the pipe for the full condition thereof. Thus is commonly done by determining the difference between the pressure in the upstream section of the pipe and the pressure in the throat of the device.

For this purpose, a signal converter 48 is mounted on the wall of the manhole 10 to receive the pressure signals from the sensors 44 and 46 through a two-lead conductor 50 extending therebetween. The converter 48 converts the signals to flow rates, and the flow rates are stored in turn in an electronic memory (not shown) within the converter. The converter 48 may also convert the difference between the pressure signals, to meter and store the flow rate of the pipe for both the full condition and the less-than-full condition thereof, as indicated.

The converter 48 may be a conventional bubbler-type mechanism, that is, one in which gas bubbles are discharged from the end of a tube (not shown) submerged in a liquid. The pressure required to maintain a predetermined bubble rate is measured using a bellows (not shown) or some other such mechanism. The pressure is proportional to the depth of submergence of the end of the tube, and a differential between two pressures can be determined by measuring the deflection of the diaphragm (not shown) of the bellows when one pressure is imposed on each side of the diaphragm. Of course, the static pressure at the top of the throat 30 is ambient air pressure until the throat fills with liquid.

The flow data may be recorded in the converter by an ink pen and a paper chart (not shown), or by a stylus and a pressure sensitive chart (not shown).

Alternatively, the converter may be a conventional electronic mechanism such as a piezoelectric mechanism (not shown) which emits electrical signals that are proportional to the pressure exerted on them. Furthermore, a digital integrated circuit mechanism (not shown) may be programmed to intermittently calculate a flow rate, and to store it in an electronic memory, given the static pressure at the entrance section 22 of the device and/or the differential pressure across the device.

In use, the device 2 is inserted into the open end of the entrance section 6 of the pipe and installed in the same in the manner of FIG. 1. At the same time, the body of the device is rotated to place the level indicator 38 at the top of the same, and to level the device using the indicator. A source of pressurized gas (not shown) is attached to the valve 15 to introduce gas into the inflatable collar 14, and the collar is inflated between the body of the device and the inside surface of the entrance section of the pipe. When inflated, the collar 14 fixes the device in position and provides a fluid tight seal between the device and the pipe. Thereafter, the conductor 50 to and from the pressure sensors 44 and 46, is routed to the top of the manhole, the converter 48 is attached to it and mounted on the wall of the manhole, and the pressure signals to the converter are employed to meter the flow in the pipe for the full condition, as well as the less-than-full condition of the same.

Figure 5:
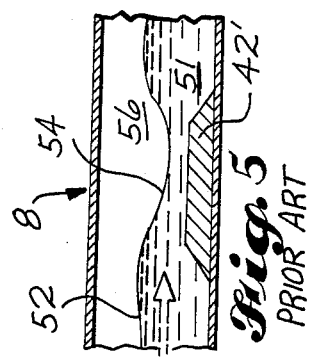
FIG. 5 is a schematic illustration of the flow through a prior art device when the liquid in the pipe is flowing in the less-than-full or open channel flow condition thereof.
Figure 6:
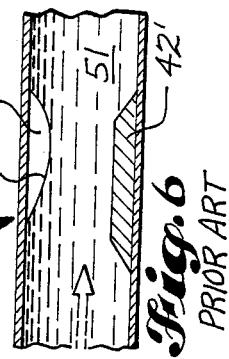
FIG. 6 is a similar illustration when the pipe has filled to the top thereof.
Figure 7:
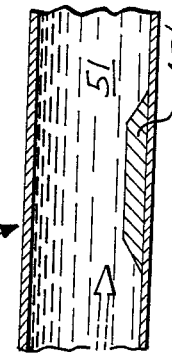
FIG. 7 is a similar illustration when the pipe is surcharged by the flow.

Referring now to FIGS. 5–10, it will be seen that when a sewer pipe 8 is open to atmosphere and the liquid 51 therein flows by gravity in the same, the liquid normally flows under open-channel flow conditions, that is, conditions wherein the pipe is less than filled with the liquid, as in FIG. 5. However, on occasion, the pipe may be flooded because of a downstream constriction, or by some unusual surge of liquid through it from upstream. In the past, it was possible, using a venturi metering device 42, to meter the flow under normal open channel flow conditions. But as the depth of flow rose to the point where the liquid filled that section of the pipe upstream from the device, it was no longer possible to get an accurate reading of the liquid flow rate. Thus, when there was flooding, the device no longer gave an accurate reading of the flow rate. Ultimately, the pipe would become so surcharged with liquid that the upstream liquid level in the pipe would rise above the top of the pipe. In this condition, the device could be employed to meter the flow as a venturi tube type pressure differential producing device. However, in the transition stage between (1) the time when the flow was such that the venturi device performed as a venturi flume, and (2) the time when the pipe was surcharged to the extent that the device performed as a venturi tube, no flow measurement was possible.

According to the present invention, the flow can be metered at all times, even in the transition stage, if the throat is dimensioned so that there is (1) "necking down" of the liquid during open channel flow and (2) zero "necking down" of the liquid when the upstream section of the pipe fills with liquid. To explain, when a venturi metering device 42 is installed in a sewer pipe 8 or the like, the device operates as a flume so long as the flow 52 is open channel flow. That is, when the flow 52 reaches the throat 56 of the device, it dips or "necks down" as seen at 54 in FIG. 5, and assumes a depth that can be calculated. This depth is termed the "critical depth." The operation of the device as a flume makes it possible, in turn, to determine the flow rate in the pipe, since a relationship exists between the upstream depth of flow and the rate of flow itself. As the depth of flow in the upstream section of the pipe increases, however, the "necked down" flow in the throat 56 of the venturi device does not increase correspondingly, and there is a point when the upstream section of the pipe fills with liquid 51 while the throat 56 continues to have "necked down" flow 54 therethrough—that is, flow with an airgap above the same, as in FIG. 6. At this point—that is, the point when the upstream section of the pipe fills with liquid—it is no longer possible to monitor the depth of flow in the upstream section of the pipe, and therefore, no longer possible to determine the rate of flow through the pipe. Meanwhile, since the throat 56 is not filled with liquid at this time, the device cannot be employed as a venturi-tube type pressure differential producing device. In fact, it will not be possible to use the device as such until the throat is force-filled with liquid, such as when the pipe becomes so surcharged with liquid that the upstream liquid level in the pipe rises above the top of the pipe. See FIG. 7. This transition stage—when the device is no longer operating as a venturi flume and yet the pipe is not so surcharged that the device will perform as a venturi tube—may exist for a considerable length of time.

Figure 9:
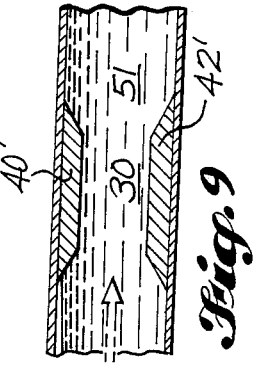
FIG. 9 is a similar illustration of the operation of the device when the flow has reached the top of the pipe, as in FIG. 6.
Figure 10:
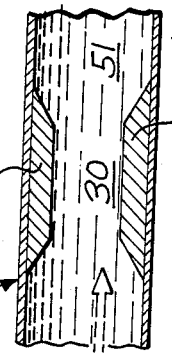
FIG. 10 is a similar illustration of its operation when the pipe is surcharged by the flow, as in FIG. 7.

Referring now to FIGS. 8-10 and the inventive device 40', 42' therein, the cross-section of the throat 30 is dimensioned, relative to that of the upstream section of the pipe, transverse the respective longitudinal axes thereof, so as to dictate that the throat 30 will fill with liquid substantially simultaneously with the upstream section of the pipe. That is, the flow 54 through the throat 30 is controlled so that the flow no longer tends to "neck down" in it when the liquid in the upstream section reaches the top of the pipe. Put another way, the "necking down" effect 54 abates to zero at that time when the upstream section of the pipe fills with liquid. In this way, a static pressure reading of the throat, and a static pressure reading of the upstream section of the pipe, will give a true reading of the flow through the pipe since the difference between the two pressures can be used to determine the flow in this transition condition.

Of course, as in the prior art devices, one can still read the static pressure of the upstream section of the pipe during open channel flow (FIG. 8), and can continue to read the throat and upstream pressures during surcharged flow (FIG. 10), so as to determine flow under all conditions, whether open channel flow, transition flow, or surcharged flow.

In order to control the flow through the throat in this fashion, however, it is necessary to provide an axially inwardly tapered entrance section 22 to the throat, as shown in FIGS. 1-4, and the entrance section must converge toward the axis of the bore in vertical planes paralleling the axis and in that axial direction relatively toward the downstream end 28 of the bore. Only when the entrance section converges in this fashion can the cross-section of the throat be dimensioned so that the "necking down" effect abates to zero when the upstream section of the pipe fills with liquid. One may constrict the sides of the entrance section, or one side, but he must also constrict the entrance section in vertical planes parallel to the axis of the bore.

Given the diameter of the sewer pipe and the range of flow rates in the same, the cross-section of the throat can be determined empirically using the following equations:

$$Q_c = \sqrt{(a^3/T) \times g} \text{ or } \frac{V_2^2}{2g} = a/2T$$

$$D_1 + \frac{V_1^2}{2g} = Z + D_c + \frac{V_2^2}{2g} + h_L$$

In the above equations, "$Q_c$" is the flow rate in the throat under open channel flow conditions; "a" is the cross-sectional area of flow in the throat and thus the cross-sectional area of the throat itself when the throat is filled with liquid; "T" is the width of the top of the flow in the throat and thus the width of the throat at the top of the same when the throat is filled with liquid; and "g" is acceleration due to gravity. "$D_1$" is the depth of flow in the upstream section of the pipe; $V_1$ is the average velocity of flow in the upstream section of the pipe; "$V_2$" is the average velocity of flow in the throat; "Z" is the height to which the bottom of the throat is raised above the bottom of the pipe (i.e., the "sill height"); "$D_c$" is the depth of flow in the throat; "$h_L$" is the head loss between the upstream section of the pipe and the throat.

Typically, the head loss can be expected to be 5-10 percent of the difference in kinetic energy (velocity head) between the upstream section of the pipe and the throat. This is a very small number for practical purposes, and therefore, for simplicity, is ignored in the example following.

To illustrate the application of the equations, assume that the pipe diameter is 8 inches, that the device itself has a ¼ inch wall thickness and that because of its wall thickness, the pipe diameter at the mouth of the device is effectively 7½ inches. Assume, moreover, that a device with a rectangular throat is to be used, and that the throat has a width of 4 inches and a sill height of 1¾ inches. For such an rectangular throat, $$Q_c = \sqrt{g} \times T \times D_c^{3/2}, \text{ and}$$

$$D_1 = D_c + Z + a/2T - \frac{V_1^2}{2g}$$

Using conventional empirical practice, $D_c$ is 4 inches or 0.333 feet.

$$Q_c = \sqrt{32.16} \times .333 \times (.333)^{2/3}$$

$$Q_c = .363 \text{ cfs}$$

$$a = .333 \times .333 = .111 \text{ sf}$$

$$D_1 = .333 + .146 + .111/(2 \times .333) - \frac{V_1^2}{2g}$$

Following the same practice, $D_1$ is the effective pipe diameter of 0.625 foot.

$$0.625 = 0.333 + 0.146 + 0.167 - 0.022 = 0.624$$

Thus, when a device with ¼ inch thick walls is inserted into an 8 inch pipe, a throat that is 4 inch square and centered in the device will cause the throat to fill with liquid substantially simultaneously with the upstream section of the pipe when the liquid depth rises therein.

The equations are equally applicable to other throat configurations. In the case of a rectangular configuration, the cross-section can be vertically rectangular, but with a risk of clogging in small diameter sewers. On the other hand, with large diameter sewers, a vertically rectangular cross-section may in fact be the most desirable to accomplish the simultaneous fill function.

The throat need not be orthogonal, nor even polygonal. It may, for example, have convexly bowed sides, and in fact, sides formed by the pipe itself, as in FIGS. 8-10.

Similarly, the body 4 of the device need not be solid. It may be hollow between the outer cylindrical wall and the bore 18 thereof; and if desired, when hollow, the cylindrical wall of the same may be perforated (not shown) to allow air and liquid to escape from within the device.

I claim:

1. A method of metering the flow of liquid which is flowing by gravity in an elongated pipe that is open to atmosphere, comprising:

installing in the pipe a tubular venturi metering device which has an open-ended bore therethrough having an axis extending end-to-end thereof, arranging the device in the pipe so that the axis of the bore is disposed substantially parallel to the longitudinal axis of the pipe and the bore thus has an end which is normally oriented upstream of the liquid flow in the pipe and an end which is normally oriented downstream of the liquid flow of the pipe, the bore having an axially inwardly tapered entrance section adjacent the upstream end thereof which converges toward the axis of the bore in vertical planes paralleling the axis of the bore relatively toward the downstream end of the bore but terminates short of the axis of the bore so that a throat is formed in the bore which opens to the downstream end thereof, forming a liquid seal between the device and the pipe at the outer periphery of the device so that the liquid in that section of the pipe disposed upstream from the upstream end of the bore of the device, is constrained to flow through the bore of the device, relatively toward the downstream end thereof, determining the static pressure of the liquid in the aforesaid upstream section of the pipe when the liquid is flowing in the pipe at a depth less than that adapted to fill the upstream section of the pipe, to meter the flow in the pipe for the less-than-full condition thereof, configuring the cross-sectional area of the throat, relative to that of the upstream section of the pipe, transverse the respective axes thereof, so that the throat will fill with liquid substantially simultaneously with the upstream section of the pipe, when the liquid depth rises therein, and providing means whereby the static pressure of the liquid in the throat of the device and the upstream section of the pipe can be determined when both the upstream section of the pipe and the throat are filled, so that the difference between the latter two pressures can be determined to meter the flow in the pipe for the full condition thereof, and thereby enable the flow in the pipe to be metered for the full condition thereof as well as the less-than-full condition thereof and the transition therebetween.

2. The method according to claim 1, further comprising leveling the bottom of the throat of the device before the respective determinations are made.

3. The method according to claim 1, wherein the throat has a polygonal cross-section, transverse the longitudinal axis of the bore of the device.

4. In combination, an elongated pipe which is open to atmosphere and adapted for the flow of liquid by gravity therein, a tubular venturi metering device installed in the pipe and having an open-ended bore therethrough which has an axis extending end-to-end thereof, the device being arranged in the pipe so that the axis of the bore is disposed substantially parallel to the longitudinal axis of the pipe and the bore thus has an end which is normally oriented upstream of the liquid flow in the pipe and an end which is normally oriented downstream of the liquid flow in the pipe, the bore having an axially inwardly tapered entrance section adjacent the upstream end thereof, which converges toward the axis of the bore in vertical planes paralleling the axis of the bore and in that axial direction of the bore relatively toward the downstream end of the bore, but terminates short of the axis of the bore so that a throat is formed in the bore which opens to the downstream end thereof, means for forming a liquid seal between the device and the pipe at the outer periphery of the device so that the liquid in that section of the pipe disposed upstream from the upstream end of the bore of the device, is constrained to flow through the bore of the device, relatively toward the downstream end thereof, and first means for determining the static pressure of the liquid in the aforesaid upstream section of the pipe when the liquid is flowing in the pipe at a depth less than that adapted to fill the upstream section of the pipe, to meter the flow in the pipe for the less-than-full condition thereof, the cross-sectional area of the throat being configured relative to that of the upstream section of the pipe, transverse the respective axes thereof, so that the throat will fill with liquid substantially simultaneously with the upstream section of the pipe, when the liquid depth rises therein, and there being second means for determining the static pressure of the liquid in the throat of the device and the upstream section of the pipe when both the upstream section of the pipe and the throat are filled, so that the difference between the latter two pressures can be determined to meter the flow in the pipe for the full condition thereof, and thereby enable the flow in the pipe to be metered for the full condition thereof, as well as the less-than-full condition thereof and the transition therebetween.

5. The combination according to claim 4 wherein the axially inwardly tapered entrance section of the bore of the device has a top, bottom and sides which taper axially inwardly of the axis of the bore in the aforesaid downstream axial direction thereof.

6. The combination according to claim 4 wherein the wall of the axially inwardly tapered entrance section of the bore has a trapezoidal cross-section in that vertical plane coinciding with the axis of the bore.

7. The combination according to claim 4 wherein the bore also has an axially outwardly tapered exit section adjacent the downstream end thereof, which diverges from the axis of the bore in the aforesaid downstream axial direction thereof.

8. The combination according to claim 7 wherein the wall of the axially outwardly tapered exit section of the bore has a trapezoidal cross-section in that vertical plane coinciding with the axis of the bore.

9. The combination according to claim 4 wherein the first pressure determination means include a first pressure sensor which is disposed on the device adjacent the upstream end of the bore.

10. The combination according to claim 9 wherein the first pressure sensor is disposed adjacent the bottom of the upstream end of the bore.

11. The combination according to claim 4 wherein the second pressure determination means include a second pressure sensor which is disposed on the device adjacent the throat of the bore therein.

12. The combination according to claim 11 wherein the second pressure sensor is disposed adjacent the top of the throat.

13. The combination according to claim 4 further comprising means for leveling one side of the device in the pipe.

14. The combination according to claim 13 wherein the leveling means are operable to level the bottom of the throat in the bore of the device.

15. The combination according to claim 4 wherein the throat has a polygonal cross section, transverse the longitudinal axis of the bore.

16. The combination according to claim 4 wherein the pipe and the device have cylindrical cross-sections transverse the respective longitudinal axes thereof, and the seal forming means include an inflatable tube which is circumposed about the device between it and the pipe.

17. The combination according to claim 16 wherein the inflatable tube is seated in an annular groove formed about the outer periphery of the device.

18. The combination according to claim 4 wherein there is a manhole to the sewer pipe, and the metering device is inserted in that portion of the pipe through which the flow enters the manhole.

19. The combination according to claim 4 further comprising means for determining the flow in the pipe under the full and less-than-full conditions thereof, from the pressure of the liquid in the throat and the upstream section of the pipe.

20. Apparatus for metering the flow of liquid which is flowing by gravity in an elongated pipe that is open to atmosphere, both for the condition wherein the pipe is less than filled with the liquid, and the condition wherein the pipe is filled with the liquid, comprising, in combination, a cylindrical member having end portions disposed at substantially the same elevation and an inner surface forming a tubular venturi-type device which in turn has an entrance section and a throat section, means circumposed about the cylindrical member and operable to form a fluid tight connection between the member and the internal wall of the pipe when the member is substantially coaxially inserted therein, whereby the liquid in that section of the pipe upstream from the member is constrained to flow through the entrance and throat sections of the venturi-type device, means for sensing the pressure of the liquid at the crest of the throat section of said tubular venturi-type device, and means for sensing the pressure of the liquid at the invert of the entrance section of said tubular venturi-type device.

21. The apparatus according to claim 20 wherein the fluid-tight connection forming means include an inflatable tube seated in an annular groove about the circumference of the cylindrical member.

22. A device for metering fluid flow comprising a cylindrical member having open ends, at least a portion of the outer surface of said cylindrical member configured substantially to fit inside the contour of an entrance pipe to a sewer manhole, a single tubular venturi-type member having an entrance section a throat section and an exit section mounted in said cylindrical member in such a manner that all of the liquid that flows through the open ends of said cylindrical member must pass through said tubular venturi-type member, means for securing said cylindrical member in said entrance pipe attached to said cylindrical member whereby a seal is established between the inside contour of said entrance pipe and an annular portion of the outer surface of said cylindrical member, means attached to the invert of the entrance section of said tubular venturi-type member to sense the pressure of the liquid therein, means attached to the crest of said throat section to sense the pressure of the liquid therein, conductor means attached to each of said pressure sensor means to conduct pressure signals therefrom, and means attached to said conductor means to convert said pressure signals into flow rates and store in said flow rate data.

23. A device for metering liquid flow in a substantially cylindrical entrance pipe to a sewer manhole, said entrance pipe flowing either partially filled or filled with liquid, said device comprising, in combination, a cylindrical member, the inner surface of which forms a tubular venturi-type member having an entrance section and a throat section therein, the outer surface of which member is dimensioned substantially to fit the inside contour of said substantially cylindrical entrance pipe, means for securing said cylindrical member in said entrance pipe and for forming a closed connection between the outer surface of said cylindrical member and the inner surface of said substantially cylindrical entrance pipe, means attached to the invert of the entrance section of said tubular venturi-type member to sense the pressure of the liquid therein, means attached to the crest of the throat section of said venturi-type member to sense the pressure of the liquid therein, conductor means attached to each of said pressure sensor means to conduct pressure signals therefrom, and means attached to said conductor means to convert said pressure signals into flow rates and store said flow rate data.

* * * * *